United States Patent [19]
Tagawa et al.

[11] Patent Number: 6,091,030
[45] Date of Patent: Jul. 18, 2000

[54] METHOD OF DETECTING A POSITION INDICATED BY AN ELECTRONIC PEN IN A DISPLAY-INTEGRATED PANEL FOR MULTILEVEL IMAGE DISPLAY

[75] Inventors: Takao Tagawa, Kashihara; Masayuki Katagiri, Ikoma; Shiro Taga, Chiba; Shigeru Shibazaki, Inzai, all of Japan

[73] Assignee: Sharp Kabushiki Kaisha, Osaka, Japan

[21] Appl. No.: 08/969,893

[22] Filed: Nov. 13, 1997

[30] Foreign Application Priority Data

Nov. 14, 1996 [JP] Japan ................................ 8-302268

[51] Int. Cl.⁷ .................................................. G08C 21/00
[52] U.S. Cl. .................................. 178/18.01; 178/18.03; 178/18.07; 178/19.01; 178/19.03; 345/179
[58] Field of Search ........................................ 345/173, 174, 345/179, 63, 68, 55, 89, 104, 147; 178/18.01, 18.03, 18.07, 19.01, 19.03

[56] References Cited

U.S. PATENT DOCUMENTS

| | | | |
|---|---|---|---|
| 3,832,693 | 8/1974 | Ishizaki et al. | 340/172.5 |
| 5,283,556 | 2/1994 | Ise | 345/174 |
| 5,448,024 | 9/1995 | Kawaguchi et al. | 178/18 |
| 5,534,892 | 7/1996 | Tagawa | 345/173 |
| 5,552,568 | 9/1996 | Onodaka et al. | 178/19 |
| 5,633,659 | 5/1997 | Furuhashi et al. | 345/173 |
| 5,642,134 | 6/1997 | Ikeda | 345/174 |
| 5,684,505 | 11/1997 | Takita et al. | 345/104 |
| 5,739,804 | 4/1998 | Okumura et al. | 345/99 |
| 5,835,072 | 11/1998 | Kanazawa | 345/60 |
| 5,844,534 | 12/1998 | Okumura et al. | 345/90 |

FOREIGN PATENT DOCUMENTS

| | | |
|---|---|---|
| 52-2335 | 1/1977 | Japan . |
| 05053726A | 3/1993 | Japan . |
| 09034640A | 2/1997 | Japan . |

*Primary Examiner*—Richard A. Hjerpe
*Assistant Examiner*—Henry N. Tran
*Attorney, Agent, or Firm*—Dike, Bronstein, Roberts & Cushman, LLP; David G. Conlin; William J. Daley, Jr.

[57] ABSTRACT

In a display-integrated panel having first and second electrodes crossing each other and being operable to display a gray scale image, a position indicated by an electronic pen is detected by a method including the step of displaying information on a display panel by repeating a step of displaying one frame. This step of displaying one frame includes the step of applying to the second electrodes second direction drive signals of predetermined waveforms in accordance with a predetermined order at timings shifted from each other, applying to the first electrodes first direction drive signals of waveforms corresponding to display intensities of pixels, respectively, thereby performing gray scale image display on each pixel, and simultaneously detecting the position of the electronic pen in the first direction based on a waveform of an induced voltage induced at the electronic pen by the second electrode located near the electronic pen; and the step of applying a voltage for position detection to the first electrodes in accordance with the predetermined second order, and detecting a position of the electronic pen in the second direction based on an induced voltage induced at the electronic pen by the voltage for the position detection.

5 Claims, 10 Drawing Sheets

METHOD OF DETECTING A POSITION INDICATED BY AN ELECTRONIC PEN IN A DISPLAY-INTEGRATED PANEL FOR MULTILEVEL IMAGE DISPLAY

BACKGROUND OF THE INVENTION

1. Field of the Invention

The present invention relates to a method for detecting a position which is indicated on an information equipment or a large display panel by an electronic pen for entering characters and graphics, and in particular to a method for detecting an indicated position on a display device, in which a gray scale image is displayed by utilizing a drive waveform because the display device itself does not have a function of gray scale image display or cannot perform the gray scale image display without difficulty.

2. Description of the Background Art

A conventional method for directly entering characters, which are written on a display panel such as a gas panel or an LCD (Liquid-Crystal Display) panel, includes a method of employing a display panel and a tablet panel (pen input panel) in a stacked form, and a method of using a display panel also as a tablet panel. In the former method, as shown in FIG. 1, a tablet panel 112 provided with a tablet drive circuit 111 of, e.g., a pressure-sensitive type or an electrostatic induction type is stacked on a display panel 114 provided with a display drive circuit 113, and an electronic pen 115 is used for input. This method has been employed in various information equipments. However, this method suffers from a problem that it is difficult to reduce the size, weight or cost of the device.

The latter method is achieved by the display-integrated tablet shown in FIG. 2. In this tablet, a display drive circuit and its scanning electrodes are used also as a tablet drive circuit and detection electrodes for input with electronic pen 115. For example, a gas panel is disclosed in Japanese Patent Laying-Open No. 52-2335 (1977) and an LCD panel is disclosed in Japanese Patent Laying-Open No. 5-53726. In these panels, a coordinate is detected by utilizing a capacity coupling between a detection electrode at the tip end of electronic pen 115 and display electrodes of the display panel which are formed of a plurality of row electrode groups and a plurality of column electrode groups perpendicular to the row electrode groups.

The gas panel proposed in the above publication utilizes an electrostatic coupling between the display electrodes and the detection electrode at the tip end of the pen. In this panel, a scanning voltage is successively applied to the display electrodes one by one, and the coordinate of the electronic pen is determined by measuring a timing at which a voltage induced at the detection electrode of the electronic pen indicates a peak value.

According to the LCD panel proposed in the above publication, as shown in FIG. 3, one frame period is time-divided into a "display period" and a "coordinate detection period", and display and coordinate detection are performed in these periods, respectively. According to this panel, a scanning voltage is successively applied to the display electrodes during the coordinate detection period, and X and Y coordinates of the electronic pen are detected by measuring the voltages induced at the detection electrode of the electronic pen.

In recent years, a PDP (Plasma Display Panel) has received attention as a gas panel display device because its size can be increased. For adding the function of detecting the coordinate with the electronic pen to the PDP, one can conceive of using the display panel also as the tablet panel for reduction in size, weight and cost, as shown in FIG. 2.

However, according to detection of the coordinate of the electronic pen, a voltage induced at the detection electrode is low and has a slowly changing waveform to be detected, and an S/N is extremely low, as also described in the foregoing Japanese Patent Laying-Open No. 52-2335. This is because the display electrodes are successively scanned one by one for detecting the coordinate, and an electrostatic capacity between the electronic pen and the detection electrode is small. As a result, the S/N of the detected voltage is low, and therefore the detection accuracy is low.

According to the aforementioned publication No. 52-2335, therefore, a plurality of (e.g., three) detection electrodes in a divided form are employed, and signal voltages are produced by differential amplification or the like of voltages induced at the electrodes for improving the detection accuracy, respectively. However, the above structure complicates the structure of the electronic pen, resulting in increase in cost. Further, the electronic pen has a tip end of a large diameter, so that manual entry such as entry at an intended coordinate point with the pen cannot be performed easily.

Recently, display of not only a monochrome image but also an image including gray scale has been strongly desired.

However, the PDP itself cannot essentially display gray scale. Technology for displaying gray scale on the PDP has been developed. This display technology typically performs the display by dividing a display period for one frame into a plurality of sub-fields so as to display gray scale. This method, however, employs two coordinate detection periods, i.e., an X coordinate detection period and a Y coordinate detection period as shown in FIG. 3. This increase in number of the sub-fields reduces the display period and therefore each sub-field period decrease because the frame period is constant. This results in increase in a drive frequency of a drive circuit, so that the display control becomes difficult. In order to avoid this disadvantage, the sub-fields may be reduced in number. In this case, however, levels of the gray scale decrease in number, which reduces the display quality.

SUMMARY OF THE INVENTION

Accordingly, an object of the invention is to provide a method of detecting a position indicated on a display panel, and particularly a method which allows detection of the position with high accuracy while maintaining an intended display quantity, and can reduce the size, weight and cost of the display panel.

Another object of the invention is to provide a method of detecting a position indicated on a display panel, and particularly a method which allows detection of the position with high accuracy even when gray scale image display is performed, and can reduced the size, weight and cost of the display panel.

Still another object of the invention is to provide a method of detecting a position indicated on a display panel, and particularly a method which can detect the indicated position with high accuracy by utilizing characteristics of a drive signal for performing gray scale image display, and can reduce the size, weight and cost of the display panel.

An additional object of the invention is to provide a method of detecting a position indicated on a display panel, and particularly a method which can detect a coordinate of the indicated position with high accuracy by utilizing characteristics of a drive signal for performing gray scale image display, and can reduce the size, weight and cost of the display panel.

Another additional object of the invention is to provide a method of detecting a position indicated on a display panel, and particularly a method which can detect a plane coordinate of the indicated position at the time of indication with high accuracy by utilizing characteristics of a drive signal for performing gray scale image display, and can reduce the size, weight and cost of the display panel.

A further additional object of the invention is to provide a method of detecting a position indicated on a display-integrated panel, and particularly a method which can detect the position with high accuracy while maintaining an intended display quantity of the display panel.

The invention relates to a method of detecting a position of an electronic pen on a display-integrated panel including a display panel having a plurality of first electrodes each extending in a first direction and aligned to each other in a second direction crossing the first direction, a plurality of second electrodes each extending in the second direction and aligned to each other in the first direction, and a plurality of pixels arranged correspondingly to crossings between the plurality of first electrodes and the plurality of second electrodes; and an electronic pen for electrostatically coupling the plurality of first electrodes and the plurality of second electrodes for outputting an induced voltage, the method being adapted to perform gray scale image display on the display panel and detect a position of the electronic pen on the display panel. This method includes the step of displaying information on the display panel by repeating the step of displaying one frame. This step of displaying the one frame includes the steps of: performing gray scale image display on each pixel by applying to the plurality of second electrodes second direction drive signals of predetermined waveforms for achieving gray scale image display in accordance with a predetermined first order at timings shifted from each other, respectively, applying to the first electrodes first direction drive signals of waveforms corresponding to the display intensities of the pixels, respectively, and simultaneously detecting a position of the electronic pen in the first direction based on a waveform of an induced voltage induced at the electronic pen by the second electrode located near the electronic pen; and applying a voltage for position detection to the first electrodes in accordance with a predetermined second order, and detecting the position of the electronic pen in the second direction based on an induced voltage induced at the electronic pen by the voltage for the position detection.

By utilizing the second direction drive signal for the gray scale image display, the indicated position in the first direction is detected based on the voltage induced at the electronic pen by the drive signal. In the display-integrated panel, it is not necessary to provide a signal period for detecting the position in the first direction within the drive signal, and a sufficient period required for display can be ensured. Therefore, it is not necessary to provide a drive circuit requiring an extremely high frequency for display, and increase in cost can be avoided.

Preferably, the first order is equal to the order of alignment of the second electrodes in the first direction. More preferably, the step of detecting the position in the first direction includes the step of performing the gray scale image display on the plurality of pixels by applying to the plurality of second electrodes the second direction drive signals of the predetermined waveforms for achieving the gray scale image display in accordance with the first order at timings shifted from each other, respectively, and applying to the first electrodes the first direction drive signals of the waveforms corresponding to the display intensities of the pixels, respectively; and detecting the position of the electronic pen in the first direction based on the timing of appearance of a predetermined feature of the waveform of the induced voltage output from the electronic pen.

Further preferably, each frame is divided into a plurality of sub-fields and a period for detecting the position in the second direction, and the plurality of sub-fields of the second direction drive signal include a scanning pulse and a preselected number of sustaining pulses following the scanning pulse and provided for each of the sub-fields for achieving the gray scale image display. The preselected numbers of the sustaining pulses for the sub-fields may be different from each other. Each frame may include the sub-fields of the number equal to a power of 2, and each sub-field of the second direction drive signal may include the sustaining pulses of $2^{n-i}$ in number where n is the number of the sub-fields in the frame and i is the position of each sub-field in the frame.

The step of detecting the position in the first direction may include the steps of: starting time counting from a point of time predetermined in each frame; measuring the time counting by detecting the fact that the induced voltage issued from the electronic pen exceeds a predetermined threshold; and obtaining the position in the first direction by effecting a predetermined arithmetic operation on a result of the measurement of the time count. The time counting may be performed with a frequency higher than a frequency of the scanning pulse, whereby the detection of the indicated position can be performed with high accuracy.

Not only one feature but also another feature may be detected for detecting the indicated position, and an average of the detected positions may be used as the result of the detection. When the result of the detection does not satisfy predetermined conditions, the result of the detection may be invalidated, whereby the reliability can be improved. The method may include the step of stopping application of the drive voltage to the first electrode simultaneously with the step of detecting the position in the second direction. This reduces noises impeding the detection, and the indicated position can be detected more accurately and reliably.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

A display device having a coordinate detecting function according to the invention can be generally applied to such a device that cannot display gray scale by itself without difficulty and therefore an appropriate drive system or another system is employed for displaying gray scale. For convenience in description, the following description will be given on a PDP which uses sub-fields for displaying gray scale. The embodiment of the invention is not restricted to this, and may be applied to an EL (electro-luminescence) panel, an FED (field emission display), an LCD panel, a ferroelectric LCD panel and others which cannot display gray scale without difficulty.

First, the PDP display device according to the invention will be described below. The drive method of the PDP for displaying gray scale can be roughly classified into an AC (alternating current) type and a DC (direct current) type. The DC type will be described below in connection with the invention. The invention is not restricted to the DC type, and may naturally be applied to the AC type and another types, as will be understood by those skilled in the art.

Figure 4:
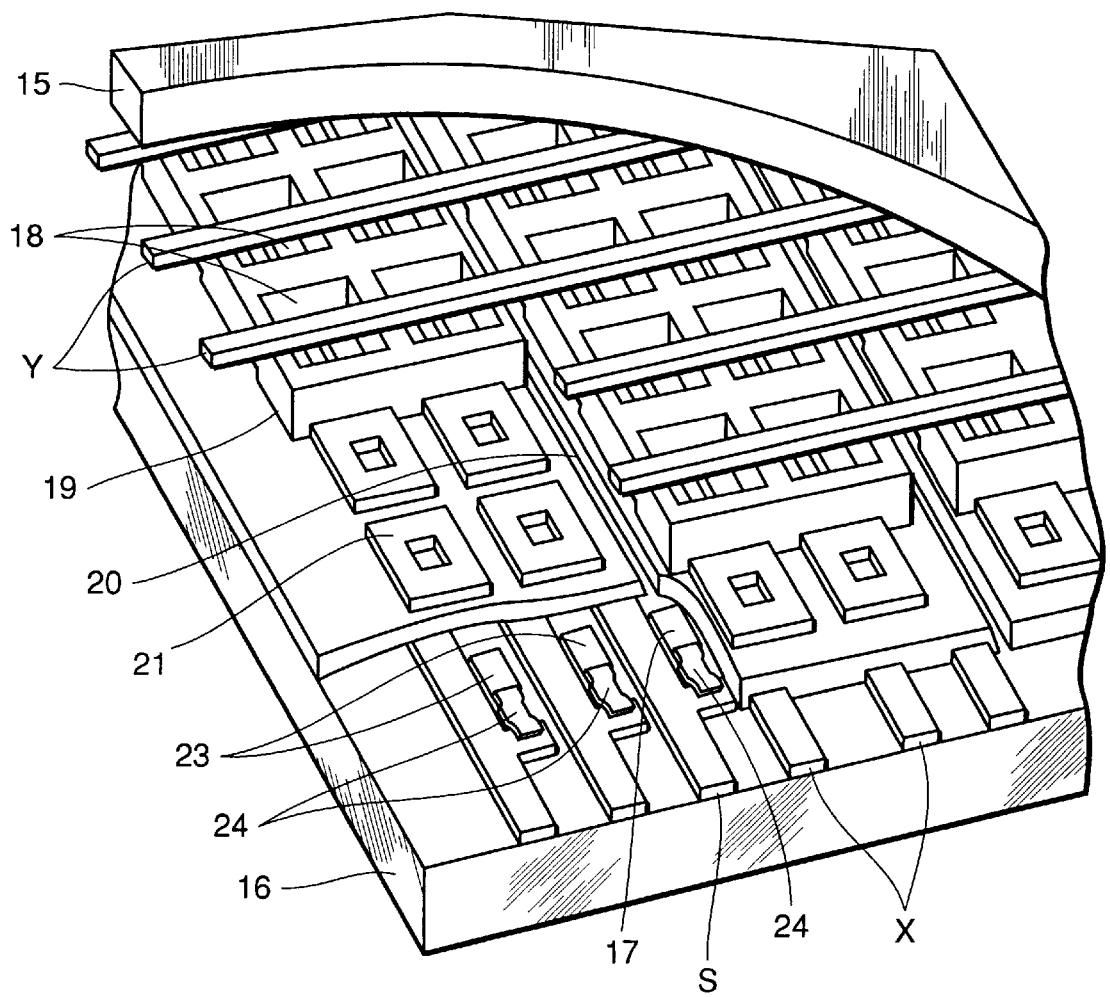
FIG. 4 is a perspective view of a structure of a PDP performing gray scale image display.

FIG. 4 shows a structure of electrodes and pixels in a PDP of the DC type. The PDP includes a plurality of display cells 18 held between a front glass plate 15 and a rear glass plate 16. The display cells 18 are isolated from each other by a partition 19, and are arranged in a matrix form. For each display cell 18, a display voltage is applied across a cathode line Y and a display anode 23, so that discharging occurs between them. This discharging emits ultraviolet rays, which excite a fluorescent material 21 applied onto an inner wall of display cell 18 to emit visible light beams. In the case of color display, fluorescent materials 21 of different colors are applied to display cells 18, and, for example, one of red, green and blue fluorescent materials is applied to the inner wall of each display cell 18.

Display anodes 23 are connected to a display anode bus line X through resistances 24, respectively. Resistance 24 prevents a flow of an excessive display current, which may cause a sputtering at the electrode and therefore reduction in life time. In an AC type, an electrode is covered with a dielectric to form an electrostatic capacity, which prevents a flow of an excessive current, so that resistance 24 is not required. Cathode line Y is supplied with a scanning voltage of about -170 V, and display anode 23 is supplied with a display voltage of about +75 V. An auxiliary anode 17 is connected to an auxiliary anode bus line S through resistance 24. Auxiliary anode 17 causes discharging between cathode line Y and the same to provide a plasma near an auxiliary discharging cell 20, which assists the discharging between discharging anodes 23 located at the opposite sides thereof and cathode line Y, and thereby improves a response time.

Figure 5:
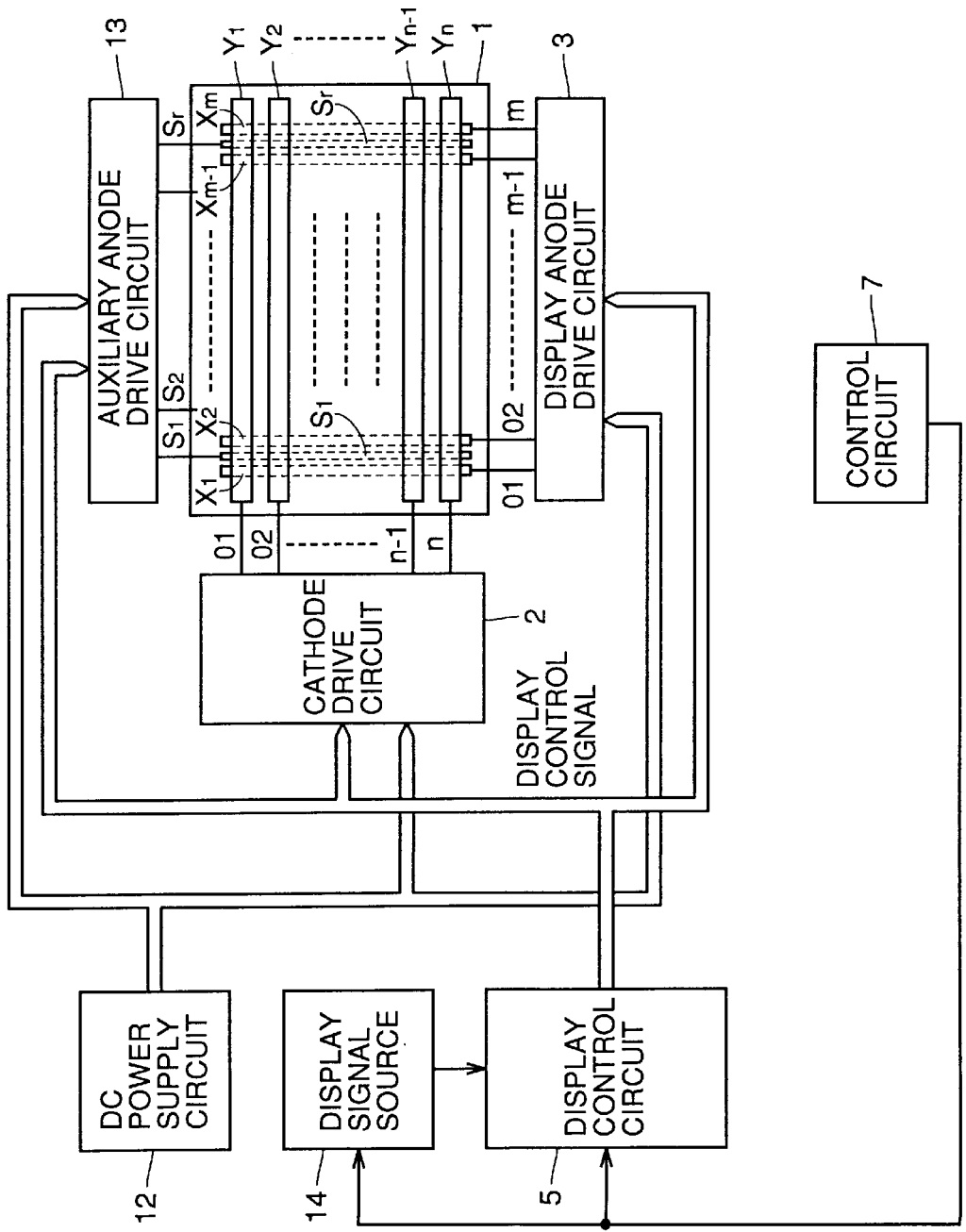
FIG. 5 is a block diagram of the PDP performing the gray scale image display.

FIG. 5 is a block diagram of a circuit for display. Display panel 1 is formed of display anode bus lines X (which will be referred to as "anodes X" hereinafter), cathode lines Y (which will be referred to as "cathodes Y" hereinafter) perpendicular to anodes X and auxiliary anode bus lines S (which will be referred to as "auxiliary anodes S" hereinafter). In FIG. 5, resistances 24 and display anodes 23 are not shown for simplicity reasons. For display information, a display signal source 14 and a display control circuit 5 supply, based on the control signal sent from control circuit 7, a display control signal to a cathode drive circuit 2, a display anode drive circuit 3 and an auxiliary anode drive circuit 13 together with a power supply voltage supplied from a DC power supply circuit 12, so that a drive voltage for display is supplied to anode X, cathode Y and auxiliary anode S of display panel 1.

Figure 6:
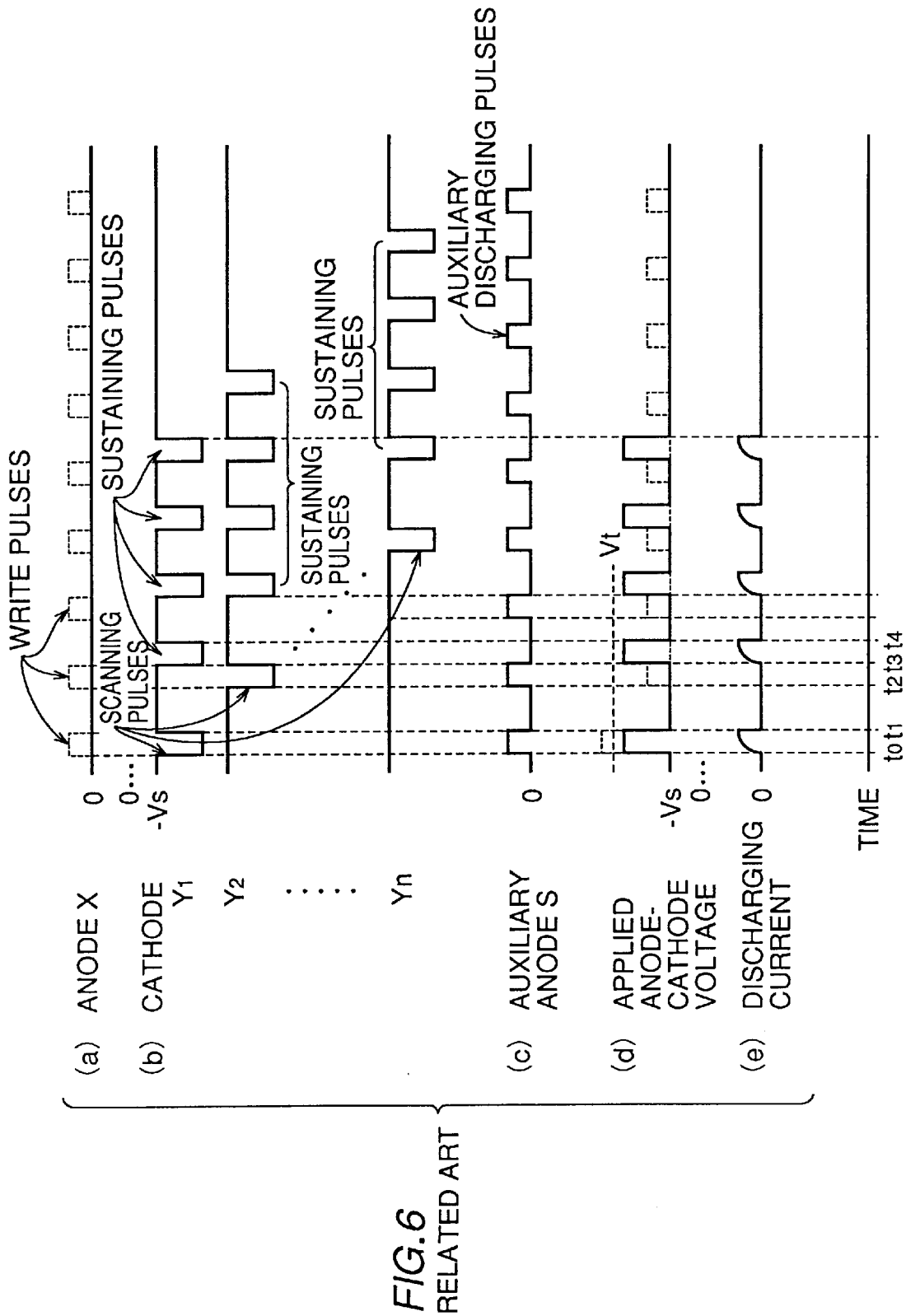
FIG. 6 is a waveform diagram showing an operation of the PDP performing the gray scale image display.

Referring to FIG. 6, in displaying a first line of cathodes $Y_1$, write pulses of a positive voltage shown by dotted line in FIG. 6a are simultaneously supplied only to the anodes of the pixels to be displayed during a period from $t_0$ to $t_1$ (anodes not to be displayed carry 0 V). These pulses are simultaneously supplied from the output terminals of display anode drive circuit 3 to the anode group (X1–Xm). Cathode $Y_1$ and auxiliary anode S are also supplied with the scanning pulse and the auxiliary discharging pulse shown in FIGS. 6b and 6c, respectively. The voltage applied across the anode and cathode of the pixel to be displayed is formed by adding a pulse represented by dotted line in FIG. 6d to a pulse represented by solid line for a time period from to to $t_1$, and exceeds a threshold $V_t$ for the discharging. The discharging between the anode and cathode starts, and a discharging current shown in FIG. 6e flows. During this current flow, ultraviolet rays are emitted and excite fluorescent materials of the display cells, so that the pixels are displayed.

The anode corresponding to the pixel not to be displayed is not supplied with the write pulse. The voltage applied across the anode and cathode of this pixel is equal to that represented by the solid line in FIG. 6d, and is lower than the threshold $V_t$ for the discharging, so that discharging and therefore display are not performed.

Likewise, display by the second row of cathode $Y_2$ is performed for a period from $t_2$ to $t_3$. Thereafter, display by the cathodes is successively performed.

The display operation for the pixel at the first row will be further discussed. The display for the pixel in the first row is performed for the period $t_0$–$t_1$ as described before. The positive and negative charges (in the plasma state) generated in the display cell performing the discharging and therefore display during this period do not disappear immediately, but will gradually disappear in a certain time. While these charges remain, i.e., for the period from $t_3$–$t_4$, sustaining pulses of the same pulse width and the same voltage as the scanning pulses are applied to cathode Y, at equal intervals as shown in FIG. 6b. During this period, the write pulse is not applied to the anode, and discharging occurs between the electrodes of the pixel (i.e., a discharging current flows) as shown at $t_3$–$t_4$ in FIG. 6e, even if the voltage applied across the anode and cathode is lower than the threshold $V_t$. This is the distinctive feature of the PDP.

As shown at $Y_1$, in FIG. 6b, therefore, the next sustaining pulse is applied before disappearance of the charges between the electrodes of the pixel, so that the discharging occurs at the pixel (display cell) every time the sustaining pulse is applied (four times in FIG. 6b), and the display by the fluorescent material is performed. In this case, the charges are not present at the pixel which was not supplied with the write pulse for the pulse application period $t_0$–$t_1$, because the discharging did not occur at the time of application of the scanning pulse. Therefore, the display is not performed during the period $t_3$–$t_4$ immediately after the above.

Thus, whether the display is performed on each pixel in the first row or not depends on the presence and absence of the write pulse for anode X at the time of application of the scanning pulse. When the sustaining pulse is applied thereafter, the state (display or non-display) at the time of application of the scanning pulse is maintained independently of the write pulse.

Therefore, during a period over which the display scanning of the second and subsequent rows is performed, each pixel in the first row continues the display of its own information, as shown in FIG. 6. Likewise, while the scanning display for the third and subsequent rows is performed, display is continuously performed as long as the sustaining pulses are applied. The sustaining pulses are applied predetermined times (four times in FIG. 6). Thus, the display is not performed row by row, but is performed for a plurality of rows in overlapped and successively shifting manners for a certain period, as will be described further in FIG. 7. If a certain interval is present between the sustaining pulses, the charges in the display cell disappear, and the cell returns to the initial state at $t_0$.

By utilizing the above properties, the PDP displays gray scale. Thus, whether the display on each pixel is allowed or not is determined at the time of application of the scanning pulse to cathode Y, and the brightness of the display is determined by the number of sustaining pulse. Thus, the display is performed by utilizing the visual sensation properties that one can sense the brightness of the pixel in proportion to the number of sustaining pulses.

Figure 7:
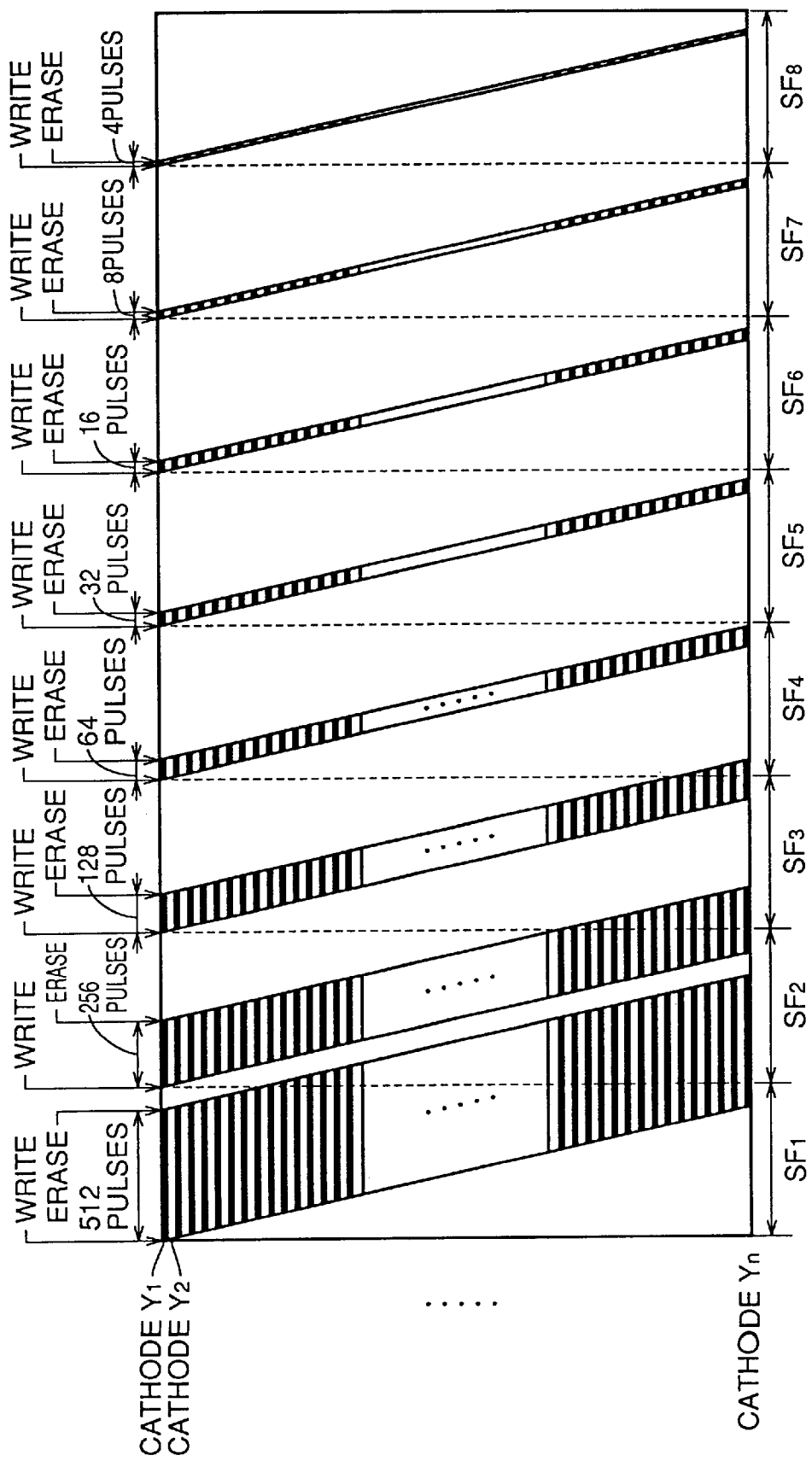
FIG. 7 shows an operation of a sub-field of the PDP performing the gray scale image display.

FIG. 7 shows an example of a time chart of the gray scale display utilizing the above properties. In the PDP, one frame (e.g., 16.7 msec) is divided into 8 sub-fields $SF_1$–$SF_8$ of different display intensities for display scanning. First, as shown in FIG. 6b, display of $SF_1$ is performed on cathodes $Y_1$–$Y_n$ by successively scanning them as shown in FIG. 6b. The number of sustaining pulses in $SF_1$ is 512 in FIG. 7. Subsequently, the display of $SF_2$ is performed. During this, the number of sustaining pulses is 256, and thereafter the number successively goes to 128, 64, 32, 16, 8 and 4. Thus, the ratio of the numbers of pulses successively goes to 128, 64, 32, 16, 8, 4, 2 and 1. Although the display of each sub-field is performed in a binary manner, a human feels the difference in display intensity from the difference in maintaining time of display, so that the intensity ratio successively goes to $128\,(2^7)$, $64\,(2^6)$, $32\,(2^5)$, $16\,(2^4)$, $8(2^3)$, $4\,(2^2)$, 2 and 1. Thus, the gray scale display at 256 levels is allowed. In FIG. 7, "write" indicates the scanning pulse in FIG. 6, and "erase" indicates the point of time that application of the last sustaining pulse is completed.

In FIG. 7, the sustaining pulses in the sub-fields are 512, 256, . . . , 8 and 4 in number, respectively. However, the scanning order is not restricted to this, and the display may be performed in the reverse sequence of 4, 8, . . . , 256 and 512 or in a random sequence. In the above manner, the sustaining pulses applied for each sub-field have the same pulse width, and are different in number from those applied for the other sub-fields. Instead of this manner, a single pulse may be used for every sub-field, and these single pulses for the different sub-fields may have different pulse widths, respectively.

Figure 1:
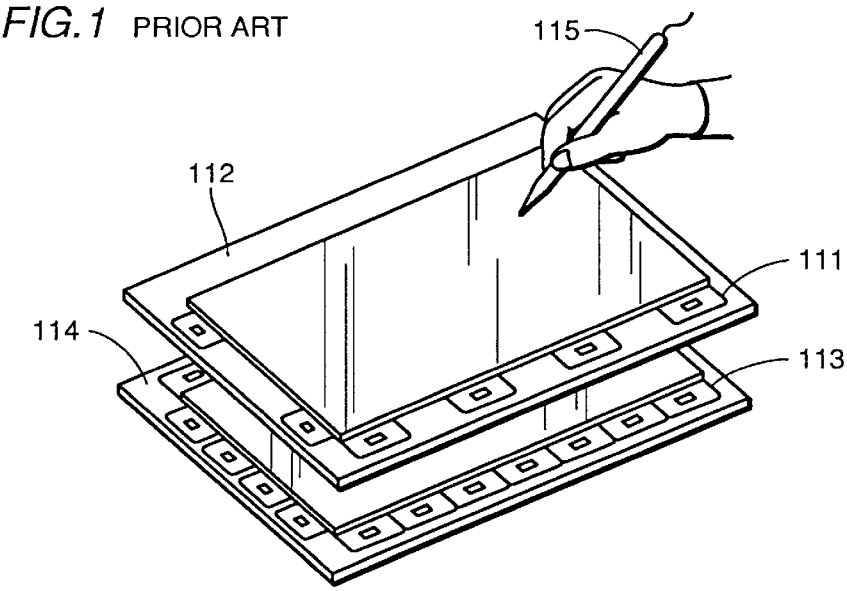
FIG. 1 shows a conventional structure having a display panel and a tablet panel in a stacked form.
Figure 2:
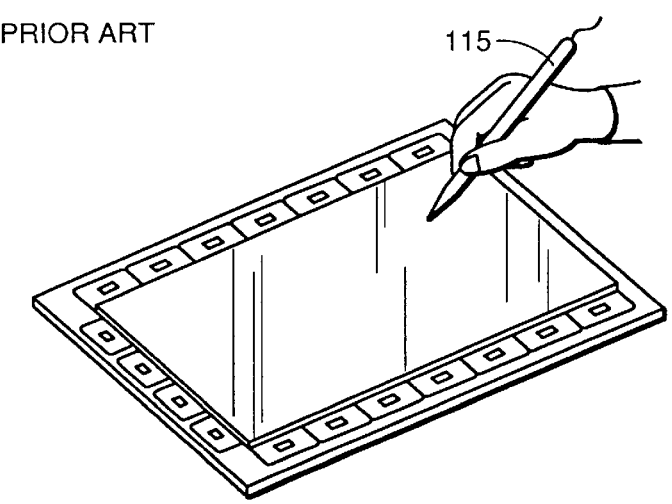
FIG. 2 shows a structure of a display-integrated tablet in the prior art.
Figure 3:
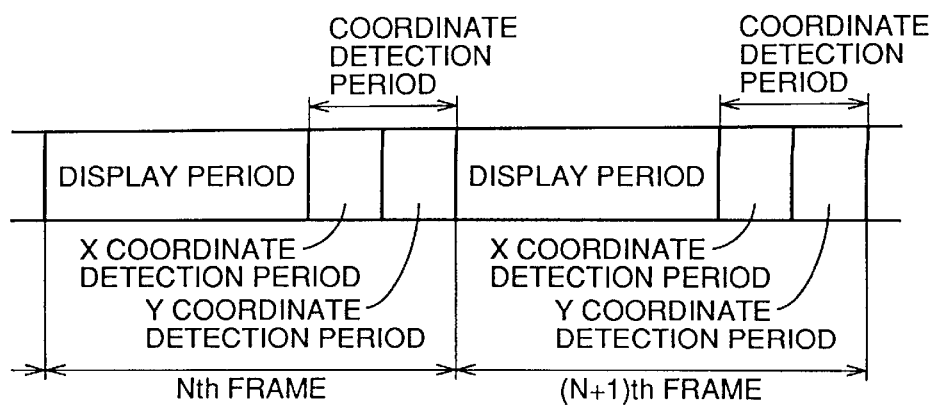
FIG. 3 shows a time-dividing operation of the display-integrated tablet.

Description will be given on the case where the foregoing PDP is applied to a display-integrated tablet. The invention is applied to the PDP in view of the fact that the PDP displays gray scale by dividing each frame into a plurality of sub-fields. According to the invention, as will be understood from the following description, the display scanning of cathode Y in the sub-fields during the display period is utilized to detect the coordinate in the Y direction during the display period, and the period for detecting the Y coordinate is not required in contrast to FIG. 3.

Figure 8:
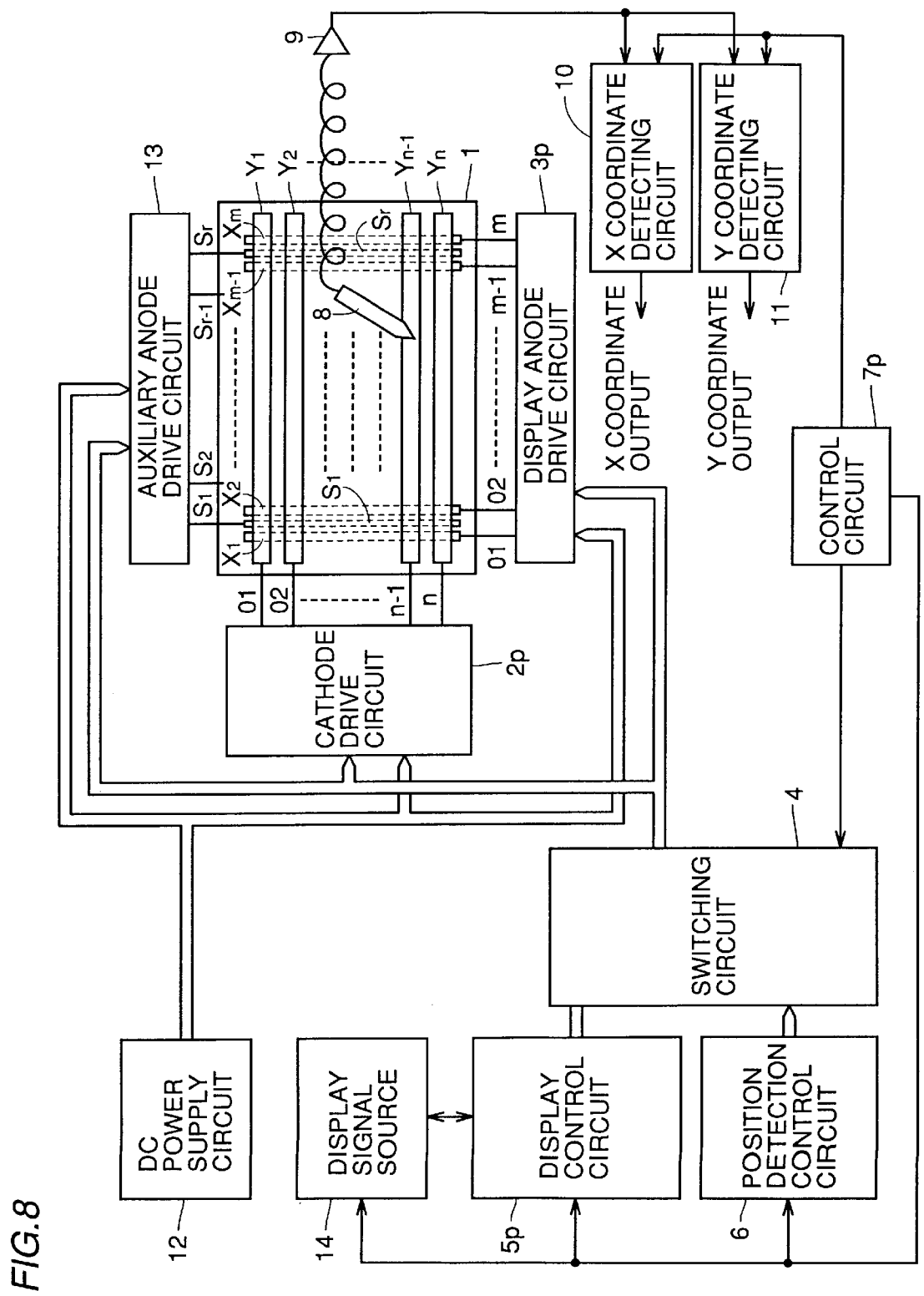
FIG. 8 is a block diagram of a display device having a coordinate detecting function of the invention.

Referring to FIG. 8, the display-integrated tablet of the embodiment of the invention includes a PDP used as a display shown in FIG. 5, and additionally includes electronic pen 8, an operational amplifier 9, an X coordinate detecting circuit 10, a Y coordinate detecting circuit 11, a position detection control circuit 6 controlled by a control circuit 7p, and a switching circuit 4. The display-integrated tablet operates in such a manner that switching circuit 4 controlled by control circuit 7p sends one of control signals of display control circuit 5p and position detection control circuit 6 to a cathode drive circuit 2p, a display anode drive circuit 3p and auxiliary anode drive circuit 13 for driving the electrodes. X and Y coordinates detected by X and Y coordinate detecting circuits 10 and 11, which are controlled by control circuit 7p, are supplied to control circuit 7p or a computer forming control circuit 7p. The X and Y coordinates obtained by an arithmetic operation and other processing, which the computer performs on the supplied coordinates for the coordinate detection, are displayed on display panel 1 by display control circuit 5p.

Figure 9:
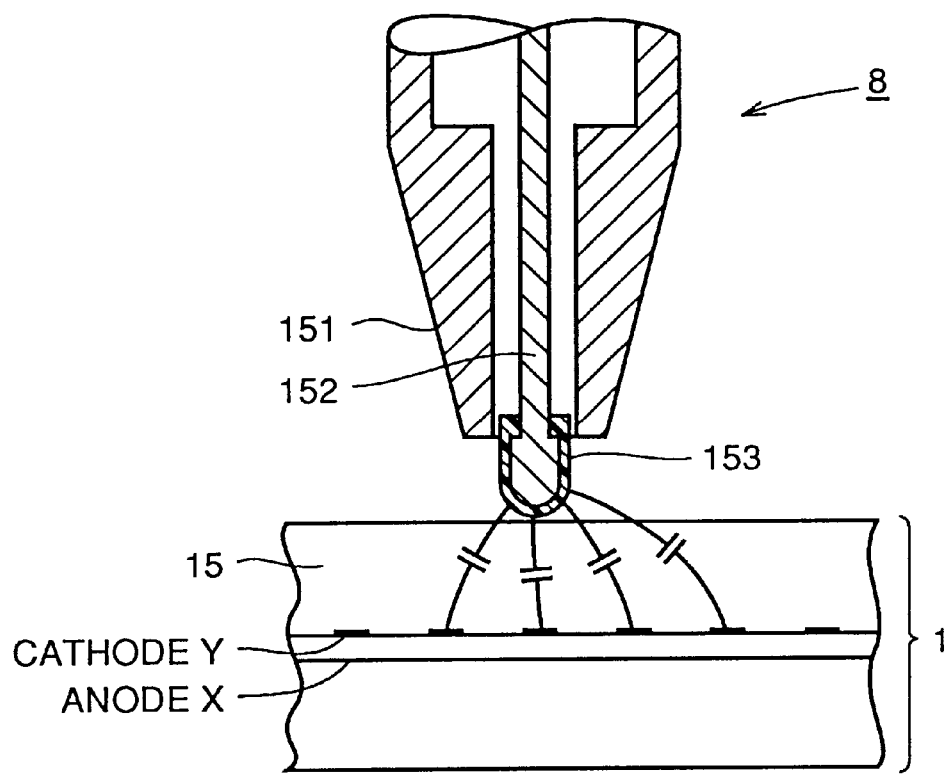
FIG. 9 is a cross section specifically showing an electronic pen.

FIG. 9 shows a structure of a tip end of electronic pen 8. A pen casing 151 is formed of a plastic member having a metal-plated surface, and the metal is grounded for shielding from external noises. Electronic pen 8 is provided at its tip end with a detection electrode 152 having a high input impedance. When the detection electrode 152 is located near display panel 1, it is electrostatically coupled to anode X and cathode Y.

In FIG. 9, electronic pen 8 is in direct contact with surface glass plate 15. In an actual structure, however, surface glass plate 15 is covered with a protective plastic sheet adhered thereto for allowing smooth movement of electronic pen 8 on an input surface, i.e., surface glass plate 15 and preventing disperse of pieces when glass plate 15 is broken due to some reasons. Hardening, antiglare treatment or the like may be effected on the surface of surface glass plate 15 for preventing a scratch by electronic pen 8.

The tip end of detection electrode 152 is also covered with resin 153 for allowing smooth movement of electronic pen 8 on the input surface and protecting the input surface and detection electrode 152. Detection electrode 152 is connected to operational amplifier 9 (not shown in FIG. 9) arranged in the casing of electronic pen 8. Operational amplifier 9 increases the input impedance of detection electrode 152, and amplifies a minute voltage induced at detection electrode 152.

The display scanning of the PDP induces the induced voltage at detection electrode 152 of electronic pen 8. Since the induced voltage contains a frequency component of the sustaining pulse, it is necessary that at least the amplification property at the first stage of the operational amplifier contains the frequency component of at least the sustaining pulse. An oscillation circuit formed of an LC and a narrowband amplifier circuit formed of circuit elements including a ceramic filter and others may be effectively employed. The amplifier represented as operational amplifier 9 may be disposed inside the casing of electronic pen 8, or may have such a structure that first amplification is performed inside electronic pen 8 and second amplification is performed by an operational amplifier, which is disposed in a main unit and is connected to electronic pen 8 through a lead.

Figure 10:
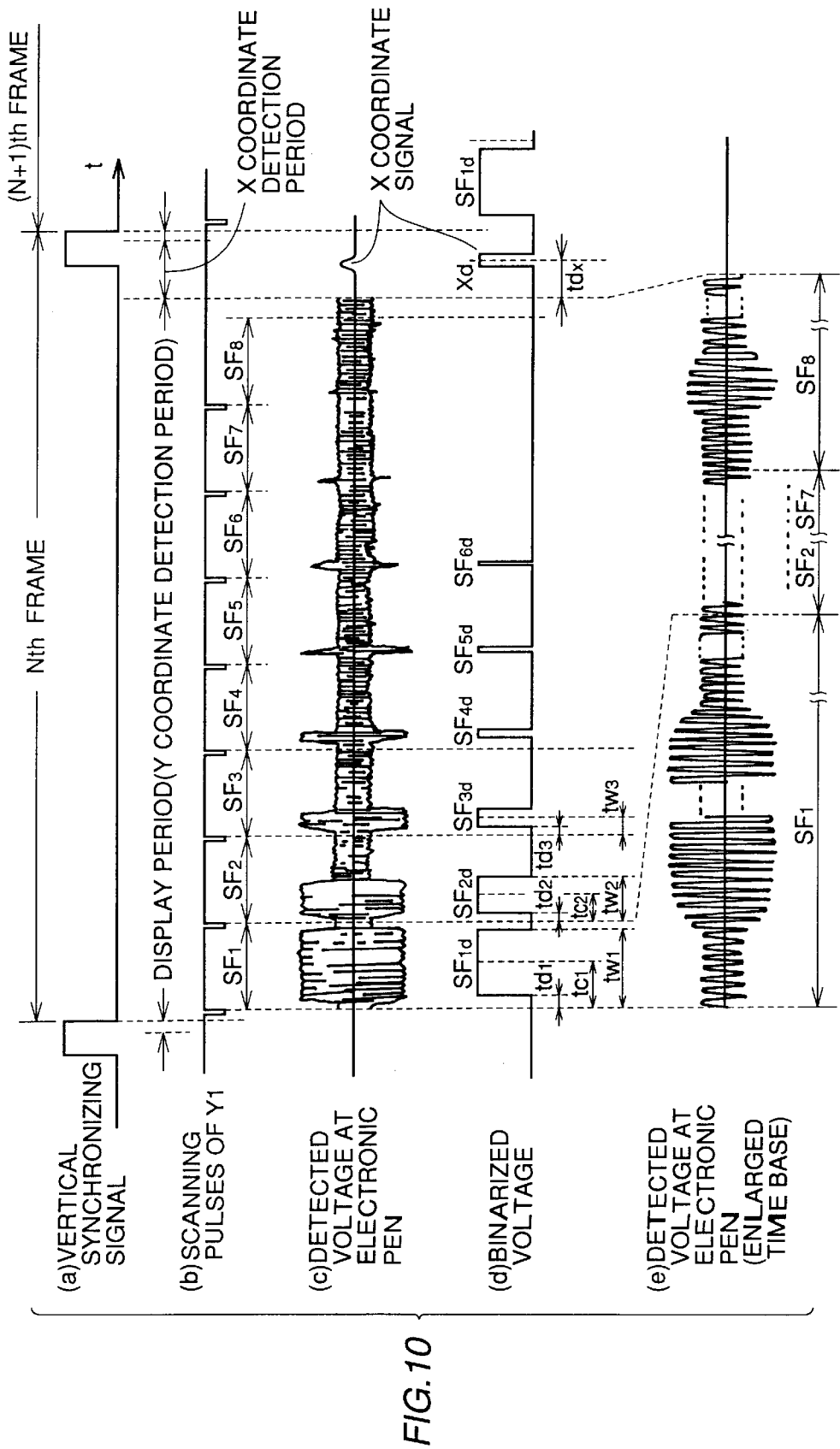
FIG. 10 is a waveform diagram showing a coordinate detecting operation according in the invention.

In this invention, each frame is time-divided into the display period and the coordinate detection period, as may be done in the prior art. However, the coordinate detection period includes only an X coordinate detection period, and does not include a Y coordinate detection period as shown in FIG. 10. This is because the Y coordinate detection is not performed during the display period.

During the display period shown in FIG. 10, switching circuit 4 in FIG. 8 selects display control circuit 5p, and the operation during this period is performed basically in the same manner as the PDP shown in FIG. 5. The display period within one frame period is shorter by the X coordinate detection period than that of the PDP. However, the X coordinate detection period may be about 3% of one frame at the most. The display periods shown in FIGS. 10 and 7 are compressed into about 97% compared with the case that the X coordinate detection period is not present. However, such a time dividing ratio does not substantially affect the display.

In the device shown in FIG. 8, the display voltage shown in FIG. 6 is applied for display to the electrode during the display period. During this, electronic pen 8 is moved toward an arbitrary position on surface glass plate 15 of panel 1. Thereby, an electrostatically induced voltage is induced at detection electrode 152 owing to the electrostatic coupling of detection electrode 152 of electronic pen 8 with respect to cathode Y and anode X. The voltage thus induced is amplified by operational amplifier 9 to provide the detection voltage shown in FIG. 10c. This voltage has a waveform, which depends on configurations of anodes X, cathodes Y and detection electrode 152 of electronic pen 8, a waveform of the display scanning voltage applied to cathode Y and characteristics of operational amplifier 9 as well as a thickness of surface glass plate 15 of display panel 1 and a thickness of the protection panel over the front surface of glass plate 15. However, a voltage similar to an amplitude-modulated waveform is detected at electronic pen 8. In FIG. 10c, the amplitude of the detection voltage exceeds the amplitude characteristics of operational amplifier 9, and is saturated at a constant value. However, the voltage is finally binarized as shown in FIG. 10d, so that the above saturation does not cause any disadvantage.

The voltage induced at detection electrode 152 of electronic pen 8 is formed of the sum of the voltage component, which is induced at the detection electrode 152 of electronic pen 8 by the voltages of the scanning pulse applied to cathode Y and the sustaining pulse, and the voltage component, which is induced at detection electrode 152 of electronic pen 8 by the display voltage applied to anode X. The voltage applied to anode X changes depending on the contents to be displayed. However, electronic pen 8 is located near cathode Y, and the voltage applied to cathode Y is higher than that applied to anode X (for example, the voltage applied to cathode Y is about −170 V while the voltage applied to anode X is about 75 V). Therefore, the voltage induced by the scanning voltage applied to the cathode forms a major component of the voltage induced at detection electrode 152 of electronic pen 8.

Referring to FIG. 10c, a portion of the waveform having a large amplitude is a component induced by the sustaining pulse for the display scanning at cathode Y, and a portion thereof having a small amplitude is an induced component at anode X. Since the voltage applied to anode X changes depending on the contents to be displayed, the amplitude of the induced voltage changes depending on the contents to be displayed but only to a small extent.

FIG. 10d shows a result obtained by such processing that the induced voltage detected at electronic pen 2 shown in FIG. 10c is processed in Y coordinate detecting circuit 10 by performing rectification and detection by a rectifier circuit, removal of a high frequency component by a low-pass filter circuit and binarization by a comparator or the like.

As shown in FIGS. 6 and 7, scanning of cathode Y for display is performed in such a manner that a plurality of cathodes are successively supplied with the voltage in an overlapped form on a time base. When a leading end of the scanned cathodes Y approaches electronic pen 8, the detection voltage induced at detection electrode 152 of electronic pen 8 gradually increases until it reaches a constant value. After reaching the substantially constant value, the voltage gradually decreases as a trailing end of the display scanning moves away from the position immediately under the electronic pen.

The embodiment of the invention has such a feature that Y coordinate can be detected up to eight times per frame. For the sub-fields (e.g., sub-fields $SF_1$, $SF_2$ and $SF_3$) having many electrodes which are simultaneously supplied with the voltage, the amplitude is saturated at the constant value as shown in FIG. 10c, when the detection voltage exceeds the amplitude characteristics of operational amplifier 9. However, the detection voltage of sub-fields such as sub-fields $SF_7$ and $SF_8$ having a small number of electrodes, which are simultaneously supplied with the voltage, is low. Therefore, it is desired from the viewpoint of improvement of S/N that the Y coordinate is detected with the detection voltage in such a state that the amplitude characteristics are saturated as is done, for example, in sub-field $SF_1$.

Accordingly, by effecting the processing such as rectification and binarization on the signal voltage detected by electronic pen 8, the binary voltage in FIG. 10d rises when a leading end of a group of cathodes Y carrying the scanning voltage of the sustaining pulse substantially reaches the position immediately under electronic pen 8, and maintains this raised level while the group of cathodes Y carrying the scanning voltage is moving immediately under electronic pen 8. When a trailing end of the group of cathodes Y substantially moves immediately after electronic pen 8, the binary voltage in FIG. 10d starts to fall.

The coordinate of electronic pen 8 is obtained from the binary voltage in FIG. 10d and the timing of application of the sustaining pulse to the Y cathode which is counted by the counter. More specifically, a time $td_1$ from the start of scanning for display, i.e., the time of falling of $Y_1$ scanning pulse in FIG. 10b to the time of rising of pulse $SF_1d$ is obtained from the counter of Y coordinate detecting circuit 10. The above rising occurs when the scanning for display in sub-fields $SF_1$ substantially reaches the position immediately after electronic pen 8. The coordinates can be detected by obtaining a time twl from the time of falling of $Y_1$ scanning pulse shown in FIG. 10b to falling of pulse $SF_1d$. The latter falling occurs when the scanning for display in $SF_1$ has substantially passed through the cathode immediately under electronic pen 8.

After obtaining the above two times $td_1$ and $tw_1$, an average $tc_1$ between them is obtained, so that the detection accuracy can be further improved. For removing a detection error caused by external noises, a difference between the two times $td_1$ and $tw_1$ which are already obtained as described above may be obtained. When the difference thus obtained is not within a predetermined range, they are rejected as the detection error, so that the detection error due to external noises may be removed. The difference between them substantially corresponds to the time period during which the sustaining pulse is applied to each sub-field. The time measuring starts based on the reference time determined by the scanning pulse of $Y_1$ in the above embodiment. However, the reference time may be determined by occurrence of another pulse spaced from the above time. It is necessary to measure the timing related to the scanning pulse for each cathode Y by a counter.

Even when the reference time and the position of electronic pen 8 are constant, $td_1$ and $tw_1$ as well as average tcl between them take on different values. Accordingly, depending on selection among $td_1$, $tw_1$ and $tc_1$ as the reference for obtaining the true coordinate, it is necessary to provide different conversion formulas or tables, whereby the coordinate can be obtained from any of the time measurements.

According to the invention, the cathodes are not successively scanned one by one, but the plurality of cathodes are supplied with the scanning voltage at a time for display. Therefore, the invention can remarkably increase the detection voltage compared with the one-by-one scanning in the prior art. Therefore, it is not necessary to divide the detection electrodes into a plurality of groups and perform differentiating processing on the detection voltages in contrast to the prior art. The detection electrode of electronic pen 8 may be formed of one point while maintaining a high accuracy of coordinate detection. Therefore, the tip end of body of electronic pen 8 can have a size similar to those of usual writing materials such as a pen.

For increasing the detection accuracy, the coordinate may be detected from $td_1$, $td_2$, etc., for each of the plurality of sub-fields, in which case the average of the detected values for each sub-field is obtained, so that the detection accuracy can be further improved.

Since the voltage is applied to the cathodes for long times in the display operation of the sub-fields $SF_1$–$SF_3$, detected falling of binary signals $SF_1d$–$SF_3d$ may enter the display periods of the subsequent sub-fields, respectively. However, the rising of these signals is always within the display periods of the sub-fields which are currently displayed, respectively. Therefore, the times $td_1$, $td_2$, etc., can be measured for each of the sub-fields. Accordingly, by performing the coordinate detection based on rising of binary signals $SF_1d$–$SF_3d$, the coordinate detection can be performed accurately in spite of the gray scale display.

When the Y coordinates are to be detected in the plurality of sub-fields, the following manner may be employed for accurate coordinate detection. Y coordinates $y_{1n}$ and $y_{5n}$ are obtained in sub-fields $SF_1$ and $SF_5$, respectively. From X coordinates $x_{n-1}$ and $x_n$ which are detected at (N−1)th and Nth frames during the X coordinate detection period, respectively, the X coordinate at the midpoint between them is obtained by calculation. The two sets of coordinates ($x_{n-1}$, $y_n$) and $\{(x_{n-1}+x_n)/2, y_{5n}\}$ are determined as the coordinates in the (N−1)th frame and Nth frame, respectively. This results in increase in number of the coordinates detected by electronic pen 8 per unit time, allowing more accurate coordinate detection.

When the Y coordinates are to be detected in the plurality of sub-fields, it is not necessary to take in, as data, all the values of the plurality of Y coordinates which are detected in the sub-fields detected during one frame period. Alternately, a distribution of the Y coordinate values detected in each sub-field may be obtained, and the detected values significantly shifted from the entire distribution may be removed by comparing them.

The frequency of the counter used for detecting the Y coordinates may be equal to that of the scanning pulse of cathode Y in FIG. 6b. However, if a higher resolution is required, a higher frequency is used for measurement, so that the coordinates can be detected with a resolution higher than the pixel density. For example, if the frequency of counter is double the frequency of sustaining pulse, the detection accuracy of half the pixel unit is attained. In this case, when the electronic pen is located at a position intermediate the pixels, the coordinate is detected not as the position of either of the pixels but as the midpoint between the pixels. For displaying on the panel the coordinate detected in the above manner, the coordinate is displayed by either or both of the pixels because the midpoint between the pixels cannot be not displayed. Therefore, although the detection with such a remarkably high accuracy may be seemed to be useless, this is actually useful. The detection with such a remarkably high accuracy improves the accuracy of recognition of characters and patterns handwritten with electronic pen 8. In the actual device, the counting is performed with the frequency four times larger than that of the sustaining pulse. A frequency larger than this cannot achieve a justifiable effect.

Figure 12:
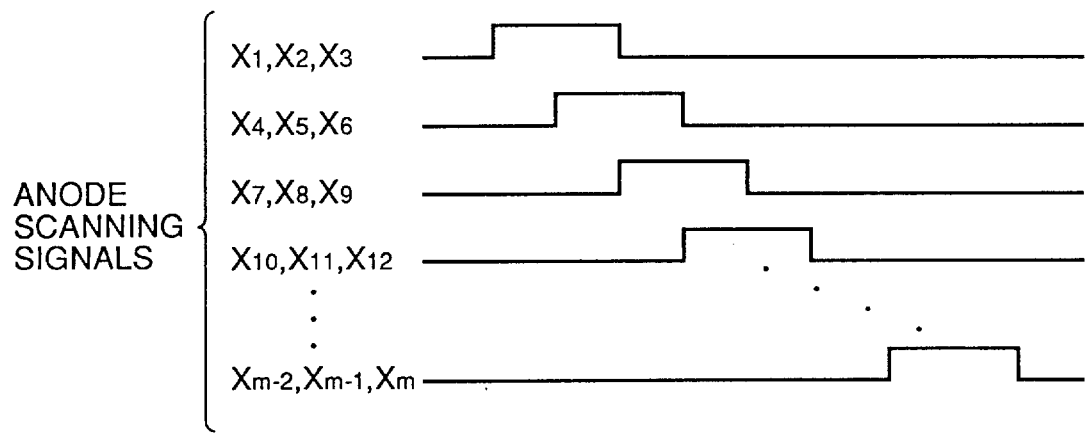
FIG. 12 shows another waveform of the scanning voltage for detecting the X coordinate in the invention.
Figure 13:
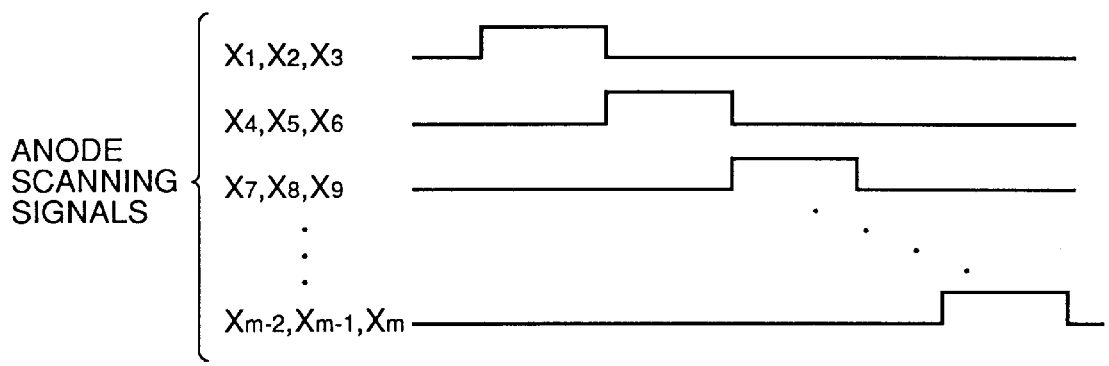
FIG. 13 shows still another waveform of the scanning voltage for detecting the X coordinate in the invention.

The manner for detecting the X coordinate will now be described below. During the display period of the device shown in FIG. 8, as described above, switching circuit 4 operates based on the control signal sent from control circuit 7p, and more specifically selects display control circuit 5p to transfer the control signal thereof to cathode drive circuit 2p, display anode drive circuit 3p and auxiliary anode drive circuit 13 for controlling these drive circuits for display. During this operation, the Y coordinate is also detected. During the X coordinate detection period, switching circuit 4 selects position detection control circuit 6 based on the control signal sent from control circuit 7p, and transfers the control signal thereof to cathode drive circuit 2p, display anode drive circuit 3p and auxiliary anode drive circuit 13 for controlling these drive circuits and thereby detecting the X coordinate similarly to the prior art. More specifically, the scanning pulse of a predetermined voltage for coordinate detection is successively applied to the anodes of display anode drive circuit 3p, the voltage induced at electronic pen 8 is measured, and the timing of this voltage application is measured by the counter of X coordinate detecting circuit 10 for detecting the X coordinate. Three examples of the scanning pulse in this operation are shown in FIGS. 11, 12 and 13, respectively.

Figure 11:
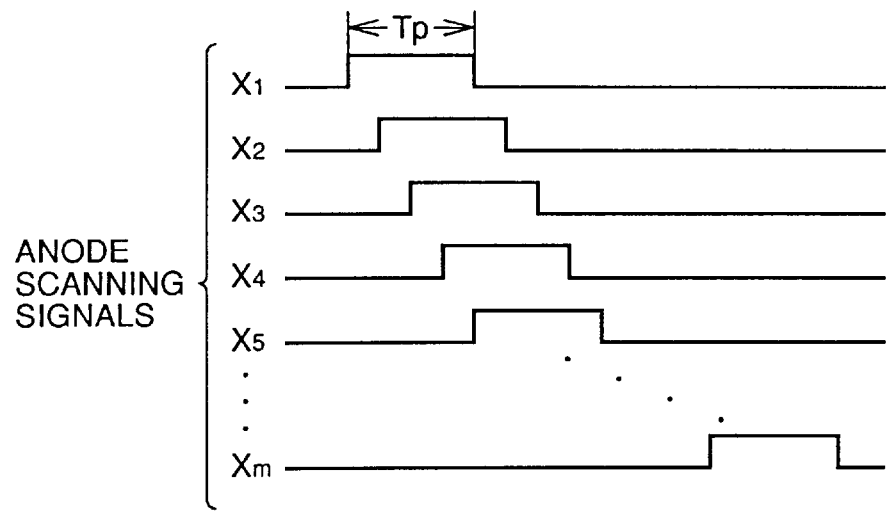
FIG. 11 shows a waveform of a scanning voltage for detecting an X coordinate in the invention.

In FIG. 11, the scanning voltage is successively applied to the anodes in such a manner that each period of the voltage application partially overlaps the application period for the neighboring anode. If the whole anodes are large in number, a long time is required for scanning all the anodes. The period for detecting the X coordinate must be long, which reduces the period for display. In view of this, it is preferable to provide the scanning voltage application periods for the neighboring anodes in the overlapped form. For further increasing the scanning speed, scanning may be simultaneously performed on each group including a plurality of (e.g., three) electrodes as shown in FIG. 12. As shown in FIG. 13, the scanning voltage application period for a group of electrodes may not overlap the scanning voltage application period for another group. In the PDP, the scanning voltage is high. For improving the breakdown voltage, therefore, the electrode of the drive LSI forming display anode drive circuit 3p has a larger size than that of a logic LSI. In accordance with this, a time for charging and discharging the electrode of the LSI and others increase, which impedes increase in operation speed of an internal shift register and others. In view of this, the scanning shown in FIG. 13 is employed, so that the structure of the drive circuit is simplified and, at the same time, the detection period is reduced.

The X coordinate detection period is set near a vertical synchronizing signal, and it is preferable to increase the display period as long as possible from the viewpoint of display. For this purpose, the manners shown in FIGS. 12 and 13 are particularly effective. Also, the manner shown in FIG. 11 can increase the display period by setting the frequency of the clock pulse to a high value.

As specific processing for the X coordinate detection shown in FIG. 10, the X coordinate is detected once for each frame and particularly at the frame before the display scanning of sub-field $SF_1$. The invention is not restricted to this. For example, the X coordinate detection period may be additionally provided between the sub-fields $SF_5$ and $SF_6$, and the X coordinates $x_{1n-1}$ and $x_5n$ may be detected at these detection periods, respectively. Based on two Y coordinates $y_{1n}$ and $y_{5n}$ detected in sub-fields $SF_1$ and $SF_5$, two coordinates $(x_{1n-1}, y_{1n})$ and $(x_{5n}, y_{5n})$ may be detected in one frame.

It is convenient that the scanning voltage in the X coordinate detection period is the same as the voltage applied to anode X for the display scanning. This makes it unnecessary to provide the circuit for switching the power supply voltage, the power supply circuit dedicated to detection of the coordinate and others, and also allows a simple structure of the LSI forming the drive circuit. Further, by setting the scanning voltage for the coordinate detection to a relatively high value similar to that for the display, a high voltage is induced at electronic pen 8, and therefore the coordinate detection can be performed with high accuracy.

In the scanning during the X coordinate detection period, it is particularly important to prevent lowering in quality of display which may be caused by luminescence of the fluorescent material of the pixel irradiated with ultraviolet rays which are emitted by discharging between cathode Y and anode X during this period. Further, it is particularly-important to prevent induction of an unnecessary voltage, i.e., voltage other than that of the scanning pulse for coordinate detection. This is because the unnecessary voltage acts as noises during detection of the X coordinate, resulting in noticeable reduction in detection accuracy.

In view of the above, the control signal of position detection control circuit 6 controls cathode drive circuit 2p to stop application of the scanning pulse and sustaining pulse to cathode Y during X coordinate detection period. Further, auxiliary anode drive circuit 13 is controlled to stop application of the auxiliary discharging pulse to auxiliary anode S. By the above control, it is preferable to detect the X coordinate of electronic pen 8 only by scanning anodes X during this period.

Figure 14:
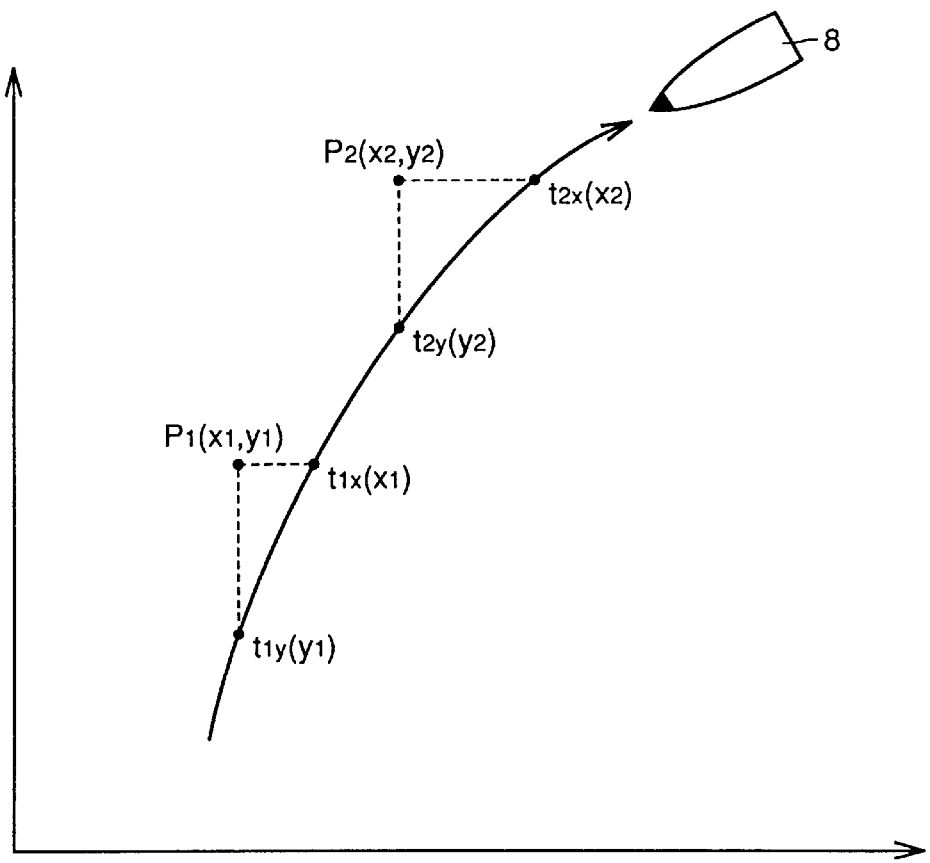
FIG. 14 shows a difference between an input coordinate of an electronic pen and a detected coordinate on an input panel.

Correction processing other than that already described is required for the detected X and Y coordinates. This will now be described below. In this invention, the Y coordinate is detected during the display period, and the X coordinate is detected during the X coordinate detecting period. Therefore, as shown in FIG. 14, a time difference is present between the X and Y coordinates. It is now assumed that the Y coordinate $(t_1y(y_1)$ in FIG. 14) is detected in sub-field $SF_1$ of Nth frame, and the X coordinate $(t_1x(x_1)$ in FIG. 14) is detected during the coordinate detection period in the same Nth frame. When the frame frequency is 60 Hz (one frame period is 16.7 msec), the time difference in detection between the paired X and Y coordinates is about 14 msec. When electronic pen 8 is moved in the direction of about 45 degrees with respect to the X and Y coordinates at a writing speed of 300 mm/sec (i.e., extremely high speed), the position of the tip end of the input pen moves 4 mm or more during a period from detection of the Y coordinate to detection of the X coordinate. As a result, the actual position of electronic pen 8 is shifted by about 2.8 mm from the position of detected coordinate $P_1(x_1, y_1)$.

Since the actual handwriting speed is much smaller than the above and is, e.g., about 100 mm/sec in many cases, a large influence is not exerted. However, the above properties are not preferable for the character recognition and others, and therefore are to be eliminated. For this purpose, the Y coordinate is detected from the sub-field, which is nearest in time to the X coordinate detection period, among the plurality of sub-fields in one frame according to the invention. For example, when the detection time difference between the X and Y coordinates is 4 msec or less, a difference of 0.8 mm is present between the actual position of electronic pen 8 and the detected position with the handwriting speed of 300 mm/sec. With the usual handwriting speed of about 100 mm/sec, the difference is small and about 0.27 mm, which causes substantially no practical disadvantage.

Thus, it is preferable in FIG. 10 that the Y coordinate detected in sub-field $SF_1$ and the X coordinate, which is detected during the X coordinate detection period nearest on the time basis to the above in the preceding (N−1)th frame, are taken into the computer as the information of the paired coordinates, and thereby the character and pattern recognition as well as display are performed. In connection with this, sub-field $SF_8$ is effective because it is nearest to the X coordinate detection period. As can be seen from FIG. 10c, however, a time period for applying the scanning voltage to cathode Y is short in sub-field $SF_8$, so that the detected voltage is low and the operation is instable. Therefore, detection of the coordinate in sub-field $SF_1$ is preferable.

In FIG. 10, the X coordinate detection period precedes sub-field $SF_1$. Alternately, the X coordinate detection period may be arranged between sub-fields $SF_1$ and $SF_2$ for detecting the X coordinate, and the Y coordinates are detected in sub-fields $SF_1$ and $SF_2$, respectively, so that the average between these Y coordinates is used as the detected coordinate. Thereby, the X and Y coordinates are detected at the substantially same point of time, which is further preferable.

Further the Y coordinates may be detected in the sub-fields such as sub-fields $SF_4$ and $SF_5$ near the center of one frame. In this case, the detected coordinate value $(Y_{a1})$ is not sent to a processing portion such as a computer, but is temporarily stored in a memory. An average $(Y_1=(Y_{a1}+Y_{a2})/2)$ is obtained between the coordinate value thus stored and Y coordinate value $(Y_{a2})$ detected in sub-fields $SF_4$ and $SF_5$, and is used as the Y coordinate. Combination with X coordinate $(x_1)$ detected during the X coordinate detection period between the above first frame and the next frame may be used as the information coordinate $(x_1, y_1)$. The following coordinate $y_2$ may be obtained from the average value between value $y_{a2}$ and a value $y_{a3}$ obtained in the next frame. This is true also with respect to the subsequent operations. In this manner, the above X coordinate detection period can be considered to correspond to the substantially intermediate point of time between the two sub-fields $SF_4$ and $SF_5$, and the detected coordinate $(x_1, y_1)$ can be considered to be substantially coincident with the actual position of electronic pen 8.

Description will now be given on the sub-field which is preferable among the sub-fields of the sustaining pulses applied to cathodes Y. As can be seen from FIG. 10*c*, the voltages induced in the sub-fields such as sub-fields $SF_1$, $SF_2$ and $SF_3$, in which the display voltage is applied to cathodes Y for relatively long periods, have values enough to the detection processing. However, the voltages induced in the sub-fields such as sub-fields $SF_8$ and $SF_7$, in which the voltage is applied to cathodes Y only for a short period, may not reach the threshold of binarization. Further, external noises and variation during production may affect the detection, so that these sub-fields are not suitable to the detection of Y coordinates.

If the voltage induced at electronic pen 8 is taken out with a sufficiently wide frequency band, the width of pulse detected in sub-field $SF_1$ is about 1 msec while the width of pulse detected in sub-field $SF_8$ is on the order of 10 $\mu$sec. In the actual device, the amplification band width of the amplifying unit such as an operational amplifier is restricted in view of an economical reason and noises.

Accordingly, it is preferable to detect the coordinates in the sub-fields such as sub-fields $SF_1$, $SF_2$ and $SF_3$ which can use high detected voltages owing to long time periods of application of the display voltage to the cathodes, and thereby can stably achieve the intended detection accuracy, and the sub-field $SF_1$ is the most preferable. It is preferable to provide low-pass or mid-pass filter characteristics which allows amplification or pass of only the signal components detected in the sub-fields using the pulses of large widths. Y coordinate detecting circuit 11 can handle only the detected signals having large pulse widths, so that noise components including high frequency components can be removed, allowing detection without an error. Also, this allows employment of inexpensive function elements having low operation frequencies, and therefore can reduce a cost of the device.

In general, noises externally applied to the detection electrode of electronic pen 8 are typically generated by a i fluorescent lamp provided with an inverter or a CRT display. The frequencies of these noises are ten-odd kilohertz or ,* more. Impulse noises generated by frictional charging between the electrode protection resin of the electronic pen and the display panel also have a frequency of ten-odd microseconds. The pulse detected in sub-field $SF_1$ has a width of about 1 millisecond which is much larger than the above. Therefore, even if impulse noise component is included at the time of coordinate detection, only the coordinate component can be taken out quite easily.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of detecting a position of an electronic pen on a display-intergrated panel while displaying a gray scale image display on the display panel, the display panel having a plurality of first electrodes each extending in a first direction and aligned to each other in a second direction crossing the first direction, a plurality of second electrodes each extending in the second direction and aligned to each other in the first direction, and a plurality of pixels arranged correspondingly to crossings between the plurality of first electrodes and the plurality of second electrodes, the electronic pen for electrostatically coupling the plurality of first electrodes and the plurality of second electrodes for outputting an induced voltage, wherein said method comprises the steps of:

displaying information on the display panel by repeating the step of displaying one frame, said step of displaying said one frame including the steps of:

performing gray scale image display on each of the pixels by applying to the plurality of second electrodes second direction drive signals of predetermined waveforms for achieving gray scale image display in accordance with a predetermined first order at timings shifted from each other, respectively applying to the first electrodes first direction drive signals of waveforms corresponding to the display intensities of the pixels, respectively, the first order being equal to the order of alignment of the second electrodes in the first direction, and simultaneously detecting a position of the electronic pen in the first direction based on a waveform of an induced voltage induced at the electronic pen by the second electrode located near the electronic pen;

applying a voltage for position detection to the first electrodes in accordance with a predetermined second order, and detecting the position of the electronic pen in the second direction based on an induced voltage induced at the electronic pen by the voltage for said position detection;

wherein said step of detecting the position in the first direction includes the steps of:

performing the gray scale image display on the plurality of pixels by applying to the plurality of second electrodes the second direction drive signals of the predetermined waveforms for achieving the gray scale image display in accordance with the first electrodes the first direction drive signals of the waveforms corresponding to the display intensities of the pixels, respectively, and detecting the position of the electronic pen in the first direction based on the timing of appearance of a predetermined feature of the waveform of the induced voltage output from the electronic pen;

wherein said one frame is divided into a plurality of sub-fields and a period for detecting the position in the second direction, and said plurality of sub-fields of the second direction drive signal include a scanning pulse and a preselected number of sustaining pulses following the scanning pulse and provided for each of said sub-fields for achieving the gray scale image display; and wherein said step of detecting the position in the first direction further includes the steps of:

starting time counting from a point of time predetermined in each frame, a first measuring step of measuring the time count at a point of time when the induced voltage issued from the electronic pen exceeds a predetermined threshold in the predetermined sub-field, a second measuring step of measuring a point of time after said induced voltage falls below said threshold after exceeding said threshold and when said induced voltage exceeds said threshold in the following sub-field within the same frame, and obtaining an average between the result of said first measuring step and the result of said second measuring step, and effecting a predetermined arithmetic operation to obtain the position in said first direction.

2. A method of detecting a position of an electronic pen on a display-intergrated panel while displaying a gray scale image display on the display panel, the display panel having a plurality of first electrodes each extending in a first direction and aligned to each other in a second direction crossing the first direction, a plurality of second electrodes each extending in the second direction and aligned to each other in the first direction, and a plurality of pixels arranged correspondingly to crossing between the plurality of first electrodes and the plurality of second electrodes, the electronic pen for electrostatically coupling the plurality of first electrodes and the plurality of second electrodes for outputting an induced voltage, wherein said method comprises the steps of:

displaying information on the display pane by repeating the step of displaying one frame, said step of displaying said one frame including the steps of:

displaying information on the display panel by repeating the step of displaying one frame, said step of displaying said one frame including the steps of:

performing gray scale image display on each of the pixels by applying to the plurality of second electrodes second direction drive signals of predetermined waveforms for achieving gray scale image display in accordance with a predetermined first order at timings shifted from each other, respectively, applying to the first electrodes first direction drive signals of waveforms corresponding to the display intensities of the pixels, respectively, the first order being equal ot the order of alginment of the second electrodes in the first direction, and simultaneously detecting a position of the electronic pen in the first direction based on a waveform of an induced of an induced voltage induced at the electronic pen by the second electronic located near the electronic pen;

applying a voltage for position detecting to the first electrodes in accordance with a predetermined second order, and detecting the position of the electronic pen in the second direction based on an induced voltage induced at the electronic pen by the voltage for said position detection;

wherein said step of detecting the position in the first direction includes the steps of:

performing the gray scale image display on the plurality of pixels by applying to the plurality of second electrodes the second direction drive signals of the predetermined waveforms for achieving the gray scale image display in accordance with the first order at timings shifted from each other, respectively, and applying to the first electrodes the first direction drive signals of the waveforms corresponding to the display intensities of the pixels, respectively, and detecting the position of the electronic pen in the first direction based on the timing of appearance of a predetermined feature of the waveform of the induced voltage output from the electronic pen;

wherein said one frame is divided into a plurality of sub-fields and a period for detecting the position in the second direction, and said plurality of sub-fields of the second direction drive signal include a scanning pulse adn a preselected number of sustaining pulses following the scanning pulse and provided for each of said sub-fields for achieving the gray scale image display, the preselected number of the sustaining pulses for said sub-fields are different from each other; and wherein said step of detecting the position in the first direction is performed within that one of said sub-fields in a field where the sustaining pulses are applied for the longest time in said field.

3. A method of detecting a position of an electronic pen on a display-intergrated panel while displaying a gray scale image display on the display panel, the display panel having a plurality of first electrodes each extending in a first direction and aligned to each other in a second direction crossing the first direction, a plurality of second electrodes each extending in the second direction and aligned to each other in the first direction, and a plurality of pixels arranged correspondingly to crossing between the plurality of first electrodes and the plurality of second electrodes, the electronic pen for electrostatically coupling the plurality of first electrodes and the plurality of second electrodes for outputting an induced voltage, wherein said method comprise the steps of:

displaying information on the display panel by repeating the step of displaying one frame, said said step of displaying said one frame including the steps of:

performing gray scale image display on each of the pixels by applying to the plurality of second electrodes second direction drive signals of predetermined waveforms for achieving gray scale image display in accordance with a predetermined first order at timings shifted from each other, respectively, applying to the first electrodes first direction drive signal of waveforms correspondingly to the display intensities of the pixels, respectively, the first order being equal to the order of alignment of the second electrodes in the first direction, and simultaneaously detecting a position of the electronic pen in the first direction based on a waveform of an induced voltage induced at the electronic pen by the second electrode located near the electronic pen;

applying a voltage for position detection to the first electrodes in accordance with a predetermined second order, and detecting the position of the electronic pen in the second direction based on an induced voltage induced at the electronic pen by the voltage for said position detection;

wherein said step of detecting the position in the first direction includes the steps of:

performing the gray scale image display on the plurality of pixels by applying to the plurality of second electodes the second direction drive signals of the predetermined waveforms for achieving the gray scale image display in accordance with the first order at timings shifted from each other, respectively, and applying to the first electrodes the first direction drive signals of the waveforms corresponding to the display intensities of the pixels, respectively, and detecting the position of the electronic pen in the first direction based on the timing of appearance of a predetermined feature of the waveform of the induced voltage output from the electronic pen;

wherein said one frame is divided into a plurality of sub-fields and a period for detecting the position in the second direction, and said plurality of sub-fields of the second direction drive signal include a scanning pulse and a preselected number of sustaining pulses following the scanning pulse and provided for each of said sub-fields for achieving the gray scale image display; and wherein said step of detecting the position in the first direction further includes the steps of:
 starting time counting from a point of time predetermined in each frame,
 a first measuring step of measuring the time count at a point of time when the induced voltage issued from the electronic pen exceeds a predetermined threshold in the predetermined sub-field,
 a second measuring step of measuring a point of time after said induced voltage falls below said threshold after exceeding said threshold and when said induced voltage exceeds said threshold in the following sub-field within the same frame, and
 obtaining an average between the result of said first measuring step and the result of said second measuring step, and effecting a predetermined arithmetic operation to obtain the position in the first direction; and wherein a period for detecting the position in the second direction is located between the sub-field for performing said first measuring step and the sub-field for performing said second measuring step.

4. A method of detecting a position of an electronic pen on a display-intergrated panel while displaying a gray scale image display on the display panel, the display panel having a plurality of first electrodes each extending in a first direction and aligned to each other in a second direction crossing the first direction, a plurality of second electrodes each extending in the second direction and aligned to each other in the first direction, and a plurality of pixels arranged correspondingly to crossings between the plurality of first electrodes and the plurality of second electrodes, the electronic pen for electrostatically coupling the plurality of first electrodes and the plurality of second electrodes for outputting an induced voltage, wherein said method comprising the steps of:

displaying information on the display panel by repeating the step of displaying one frame, said step of displaying said one frame including the steps of:
 performing gray scale image display on each of the pixels by applying to the plurality of second electrodes second direction drive signals of predetermined waveforms for achieving gray scale image display in accordance with a predetermined first order at timings shifted from each other, respectively,
 applying to the first electrodes first direction drive signals of waveforms corresponding to the display intensities of the pixels, respectively, the first order being equal to the order of alignment of the second electrodes in the first direction, and
 simultaneously detecting a position fo the electronic pen in the first direction based on a waveform of an induced voltage induced at the electronic pen by the second electrode located near the electronic pen;

applying a voltage for position detection to the first electrodes in accordance with a predetermined second order, and detecting the position of the electronic pen in the second direction based on an induced voltage induced at the electronic pen by the voltage for said position detection;

wherein said step of detecting the position in the first direction includes the steps of:

performing the gray scale image display on the plurality of pixels by applying to the plurality of second electrodes the second direction drive signals of the predetermined waveforms for achieving the gray scale image display in accordance with the first order at timings shifted from each other, respectively, and applying to the first electrodes the first direction drive signals of the waveforms correspondingly to the display intensities of the pixels, respectively, and detecting the position of the electronic pen in the first direction based on the timing of appearance of a predetermined feature of the waveform of the induced voltage output from the electronic pen;

wherein said one frame is divided into a plurality of sub-fields and a period for detecting the position in the second direction, and said plurality of sub-fields of the second direction drive signal include a scanning pulse and a preselected number of sustaining pulses following the scanning pulse and provided for each of said sub-fields for achieving the gray scale image display;

wherein the second order is equal to the order of alignment of the first electrodes in the second direction; and wherein said detection of the position in the first direction is performed within said sub-field nearest on the time basis to the period form performing said detection of the position in the second direction.

5. A method of detecting a position of an electronic pen on a display-intergrated panel while displaying a gray scale image display on the display panel, the display panel having a plurality of first electrodes each extending in a first direction and aligned to each other in a second direction crossing the first direction, a plurality of second electrodes each extending in the second direction and aligned to each other in the first direction, and a plurality of pixels arranged correspondingly to crossings between the plurality of first electrodes and the plurality of second of second electrodes, the electronic pen for electrostatically coupling the plurality of first electrodes and the plurality of second electrodes for outputting an induced voltage, wherein said method comprises the steps of:

displaying information on the display panel by repeating the step of displaying one frame, said step of displaying said one frame including the steps of:
 performing gray scale image dispaly on each of the pixels by applying to the plurality of second electrodes second direction drive signals of predetermined waveforms for achieving gray scale image display in accordance with a predetermined first order at timings shifted from each other, respectively,
 applying to the first electrodes first direction drive signals of waveforms corresponding to the display intensities of the pixels, respectively, the first order being equal to the order of alignment of the second electrodes in the first direction, and
 simultaneously detecting a position of the electronic pen in the first direction based on a waveform of an induced voltage induced at the electronic pen by the second electrode located near the electronic pen;

applying a voltage for position detection to the first electrodes in accordance with a predetermined second order, and detecting the position of the electronic pen in the second direction based on an induced voltage induced at the electronic pen by the voltage for said position detection;

wherein said step of detecting the position in the first direction includes the steps of:

performing the gray scale image display on the plurality of pixels by applying to the plurality of second electrodes the second direction drive signals of the predetermined waveforms for achieving the gray scale image display in accordance with the first order at timings shifted from each other, respectively, and applying to the first electrodes the first direction drive signals of the waveforms corresponding to the display intensities of the pixels, respectively, and detecting the position of the electronic pen in the first direction based on the timing of appearaned of a predetermined feature of the waveform of the induced voltage output from the electronic pen;

wherein said one frame is divided into a plurality of sub-fields and a period for detection the position in the second direction, and said plurality of sub-fields of the second direction drive signal include a scanning pulse and a preselected number of sustaining pulses following the scanning pulse and provide for each of said sub-fields for achieving the gray scale image display; and wherein detection of the position of the electronic pen in the first direction is performed during one of a first, second and third sub-fields of said plurality of sub-fields and wherein detection of the position of the electronic pen in the second direction is performed prior to the first sub-field of said plurality of sub-fields.

* * * * *